United States Patent
Cherolis et al.

(10) Patent No.: US 7,175,386 B2
(45) Date of Patent: Feb. 13, 2007

(54) AIRFOIL WITH SHAPED TRAILING EDGE PEDESTALS

(75) Inventors: Anthony Cherolis, East Hartford, CT (US); Wieslaw A. Chlus, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 368 days.

(21) Appl. No.: 10/738,842

(22) Filed: Dec. 17, 2003

(65) Prior Publication Data

US 2005/0135922 A1    Jun. 23, 2005

(51) Int. Cl.
*F01D 5/14* (2006.01)

(52) U.S. Cl. .................... 415/115; 416/97 R

(58) Field of Classification Search ............ 415/115; 416/97 R
See application file for complete search history.

(56) References Cited

U.S. PATENT DOCUMENTS

| | | | | |
|---|---|---|---|---|
| 3,628,880 A | * | 12/1971 | Smuland et al. ............ 415/115 |
| 4,180,373 A | * | 12/1979 | Moore et al. ............. 416/97 R |
| 4,236,870 A | * | 12/1980 | Hucul et al. ............. 416/97 R |
| 4,278,400 A | * | 7/1981 | Yamarik et al. .......... 416/97 R |
| 4,474,532 A | * | 10/1984 | Pazder ..................... 416/97 R |
| 4,515,523 A | * | 5/1985 | North et al. ................ 415/115 |
| 4,786,233 A | * | 11/1988 | Shizuya et al. ........... 416/97 R |
| 5,462,405 A | * | 10/1995 | Hoff et al. ................ 416/97 R |
| 5,800,124 A | | 9/1998 | Zelesky |
| 5,947,687 A | | 9/1999 | Mori |
| 6,257,831 B1 | * | 7/2001 | Papple et al. ............. 416/97 R |
| 6,390,775 B1 | | 5/2002 | Paz |
| 6,419,447 B1 | | 7/2002 | Watanabe |
| 6,481,966 B2 | * | 11/2002 | Beeck et al. ............. 416/97 R |
| 6,481,967 B2 | | 11/2002 | Tomita |
| 6,599,092 B1 | * | 7/2003 | Manning et al. .......... 416/97 R |

\* cited by examiner

*Primary Examiner*—Edward K. Look
*Assistant Examiner*—Igor Kershteyn
(74) *Attorney, Agent, or Firm*—Carlson, Gaskey & Olds

(57) ABSTRACT

A blade for a gas turbine engine includes a trailing edge cooling chamber, wherein the pressure and suction sides are connected by an array of spaced pedestals. The pedestals in a region most subject to thermal stresses are formed to be elliptical, such that the thermal stresses are spread over a larger area. Thus, stress concentrations are reduced. Also, various sized cylindrical pedestals may be used at other locations.

33 Claims, 4 Drawing Sheets

AIRFOIL WITH SHAPED TRAILING EDGE PEDESTALS

BACKGROUND OF THE INVENTION

This application relates to an airfoil for a turbine blade, wherein pedestals connecting opposed walls in a trailing edge cooling chamber have cross-sections designed to accommodate thermal stress.

Turbine blades are utilized in gas turbine engines. As known, a turbine blade typically includes a platform, with an airfoil shape extending above the platform. The airfoil is curved, extending from a leading edge to a trailing edge. Moreover, there is a pressure side and a suction side to the airfoil. The pressure side becomes much hotter than the suction side during operation.

Cooling channels are formed within the airfoil body to circulate cooling air. One type of cooling channel which is used particularly adjacent the trailing edge is an open chamber having cylindrical pedestals connecting opposed suction and pressure side walls. Cooling air flows around these pedestals, and through the open chamber. Typically, the pedestals have had a generally equal diameter.

In this prior art, the cylindrical pedestals have sometimes been subject to concentrated heat-induced stress. In particular, since the pressure side is much hotter than the suction side, there is more thermal expansion on the pressure side. This is particularly true adjacent the platform. Since the pressure side of the airfoil expands for a greater extent than the suction side, concentrated stresses are applied to the pedestals. This is undesirable.

SUMMARY OF THE INVENTION

In a disclosed embodiment of this invention, non-cylindrical pedestals connect the opposed walls of a trailing edge cooling chamber. In particular, the pedestals are formed to have a greater dimension in a direction generally parallel to a plane of the platform. This greater dimension spreads the stress concentration over a greater length. Most preferably, the shape is elliptical, with the major diameter being measured generally parallel to the platform. This shape creates a larger radius that lowers the stress concentrations.

In other features of this invention, the elliptical pedestals are utilized only in selected areas. In particular, the elliptical pedestals are preferably utilized adjacent the platform, wherein the stress concentrations are of greater concerns.

Having cylindrical pedestals at other areas reduces the manufacturing complexity of forming the inventive airfoil. As will be explained below, it is somewhat easier to form a cylindrical pedestal than to form an elliptic pedestal.

In another broad aspect, the pedestals could be said to have differing cross-sections across the array of pedestals. In one preferred embodiment, there are cylindrical pedestals of a first smaller diameter adjacent a leading edge end of the cooling chamber, and cylindrical pedestals of a larger diameter adjacent the trailing edge. The elliptical pedestals are most preferably arranged intermediate the two sizes of cylindrical pedestals. The purpose of this arrangement will be described in greater detail below.

These and other features of the present invention can be best understood from the following specification and drawings, the following of which is a brief description.

DETAILED DESCRIPTION OF THE PREFERRED EMBODIMENT

Figure 1:
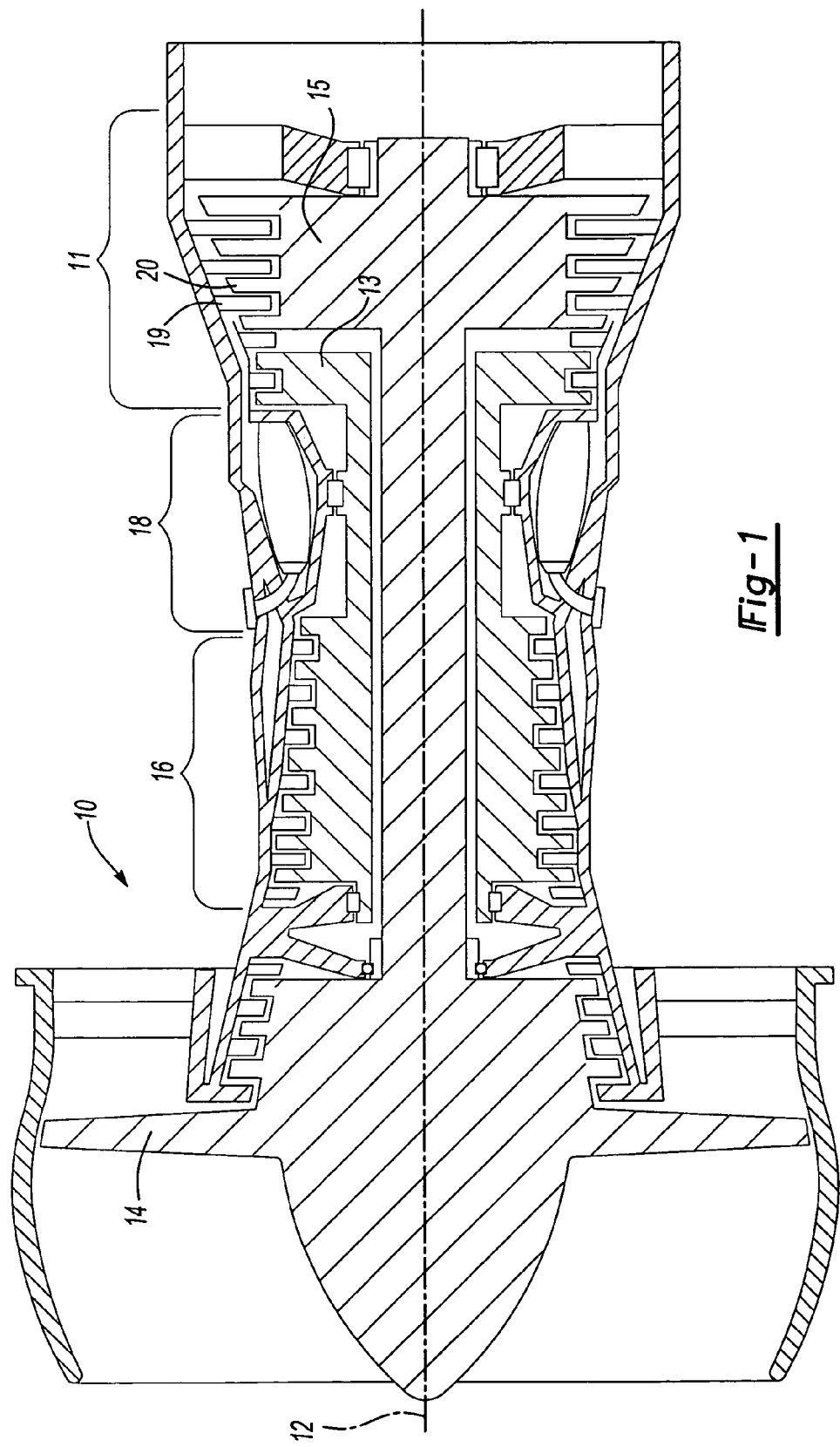
FIG. 1 is a schematic of a gas turbine engine incorporating the present invention.

FIG. 1 shows a gas turbine engine 10, such as a gas turbine used for power generation or propulsion, circumferentially disposed about an engine centerline, or axial centerline axis 12. The engine 10 includes a fan 14, a compressor 16, a combustion section 18 and a turbine 11. As is well known in the art, air compressed in the compressor 16 is mixed with fuel which is burned in the combustion section 18 and expanded in turbine 11. The air compressed in the compressor and the fuel mixture expanded in the turbine 11 can both be referred to as a hot gas stream flow. The turbine 11 includes rotors 13 and 15 that, in response to the expansion, rotate, driving the compressor 16 and fan 14. The turbine 11 comprises alternating rows of rotary blades 20 and static airfoils or vanes 19. FIG. 1 is a somewhat schematic representation, for illustrative purposes only, and is not a limitation of the instant invention, that may be employed on gas turbines used for electrical power generation and aircraft.

Figure 2:
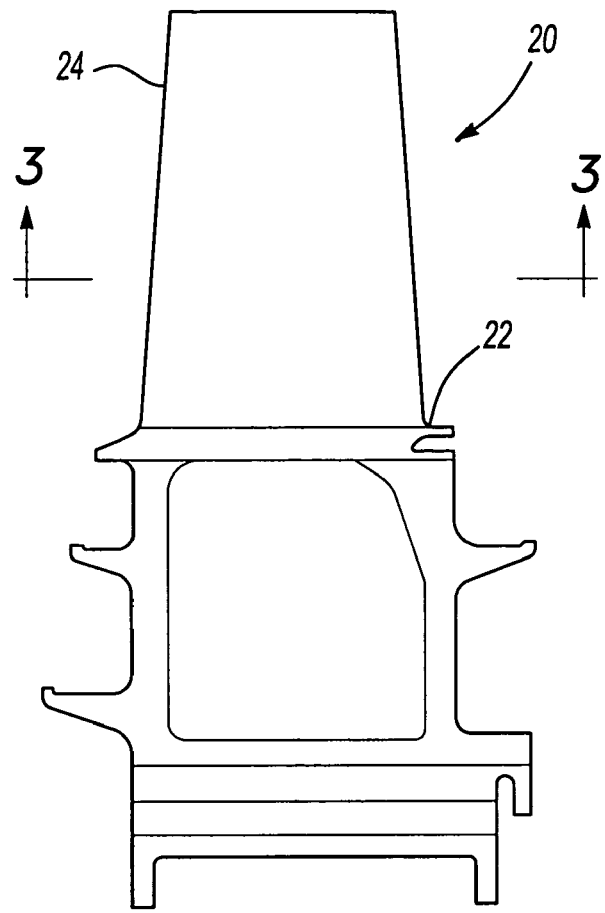
FIG. 2 is a view of a single turbine blade.

FIG. 2 shows blade 20 having a platform 22. As is known, a curved airfoil 24 extends upwardly from the platform 22.

Figure 3:
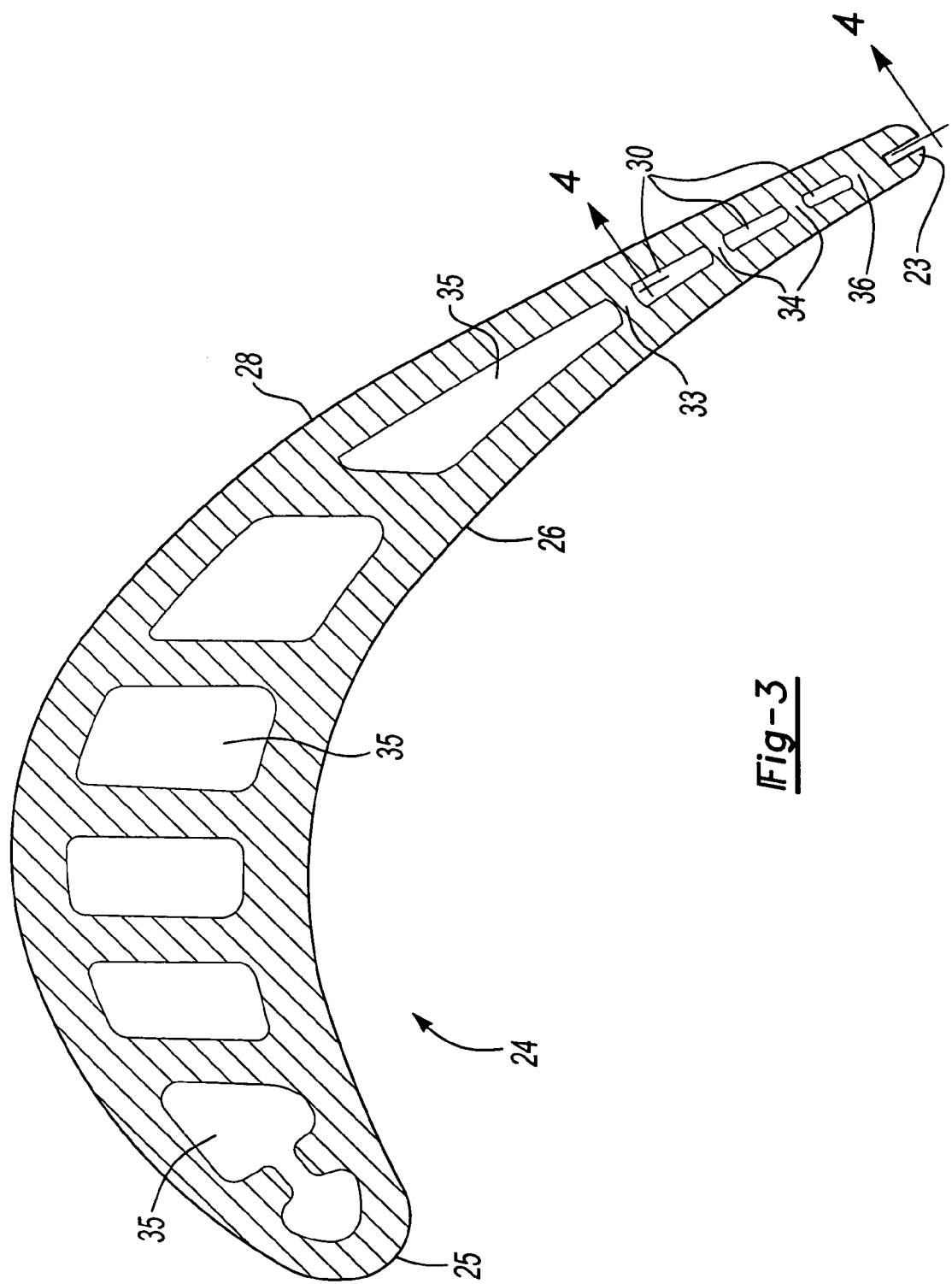
FIG. 3 is a cross-sectional view through the inventive turbine blade.

As shown in FIG. 3, the airfoil 24 has a leading edge 25 and a trailing edge 23. A pressure side 26 contacts a hotter fluid than the suction side 28. Cooling passages 35 extend to provide one or more serpentine and straight cooling flow paths through the great bulk of the airfoil 24.

An open cooling chamber 30 is formed adjacent the trailing edge 23. A wall 33 separates passage 35 from chamber 30. As shown in chamber 30, pedestals 34 and 36 connect the opposed pressure 26 and suction 28 walls. Other than the discrete pedestals 34 and 36 (and pedestals 32, see FIG. 4), the chamber 30 is relatively open allowing flow of cooling air.

Figure 4:
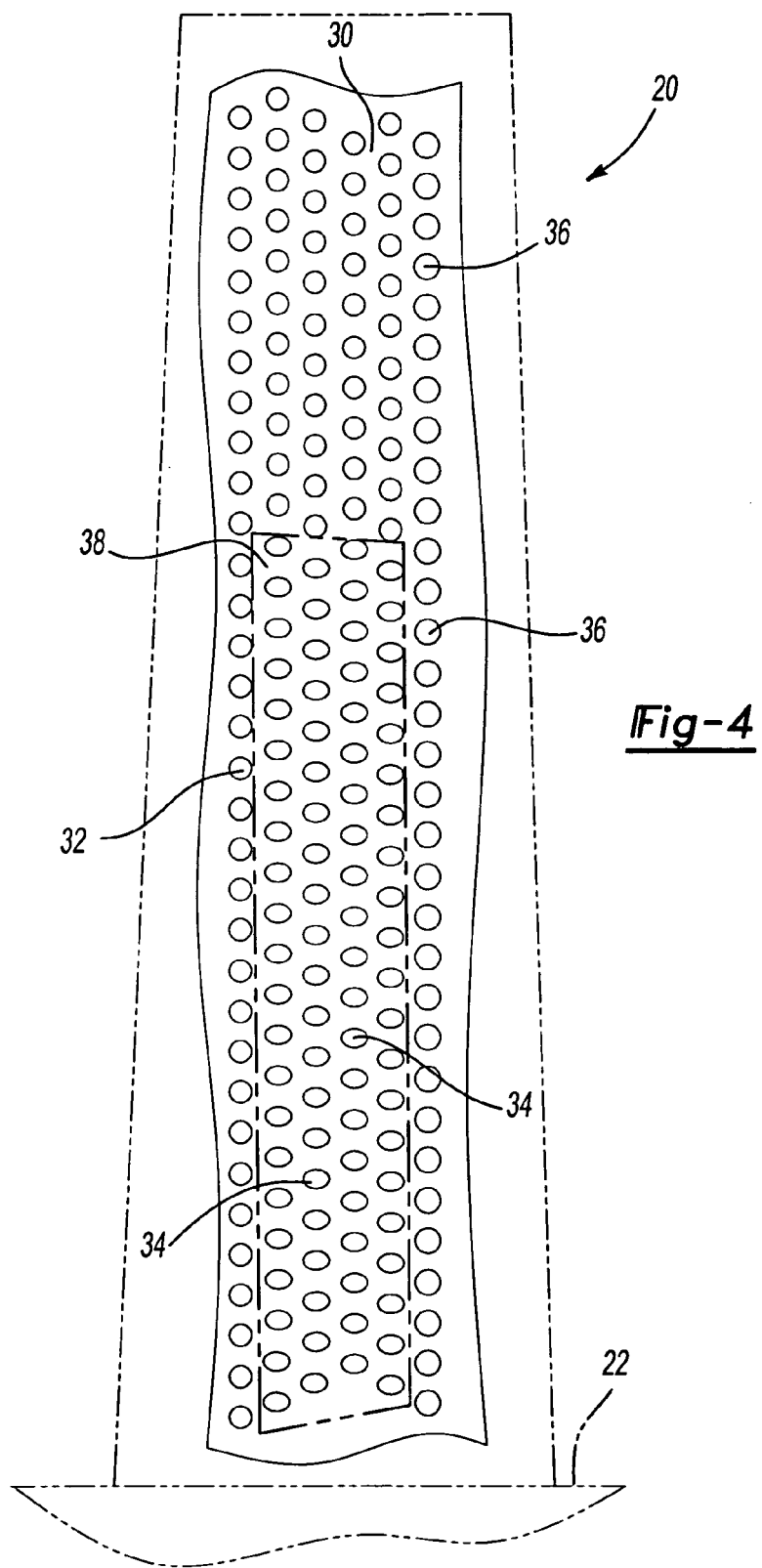
FIG. 4 is a view through a portion of the FIG. 3 cross-section.

As shown in FIG. 4, the pedestals are spaced in an array along the length of the airfoil. A region 38 is defined having elliptic pedestals 34. As shown, elliptic pedestals 34 are used particularly around the lower edge of the array and adjacent the platform 22. As can be appreciated, the chamber 30 extends around and past the pedestals 32, 34 and 36. Pedestals 32 and 36 are cylindrical. As is clear from FIG. 4, the array of pedestals includes columns extending along the length of the airfoil. There are a plurality of columns of elliptic pedestals 34 illustrated, and in the disclosed embodiment four such columns. There is a column of cylindrical pedestals adjacent each edge of the portion of the array that includes the elliptic pedestals 34.

Generally, it is somewhat easier to form cylindrical pedestals than to form elliptic pedestals. Thus limiting the elliptic pedestals 34 to the region 38 where they are most needed does somewhat simplify manufacturing. In particular, the blade 20 is typically cast from a lost core casting technique. In such a technique, the core will initially have openings that form the pedestals 32, 34 and 36. Such openings have a flashing that is to be removed. A cylindrical opening is easiest to clean, as a simple cylindrical tool might be inserted into the opening. The elliptic openings require more work to clean.

Figure 5:
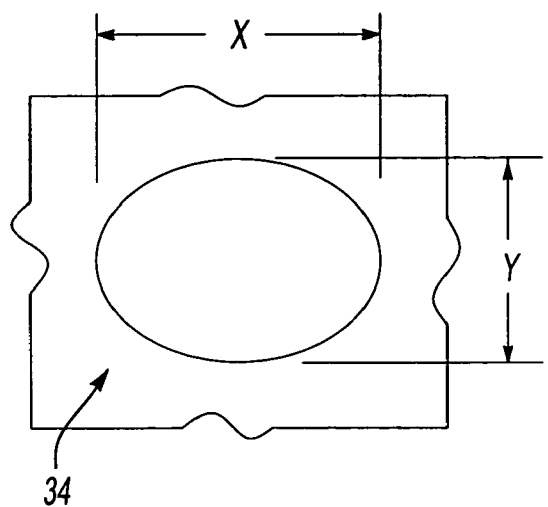
FIG. 5 shows an inventive pedestal.

As can be appreciated from FIG. 5, the elliptic pedestal 34 have a major diameter X that is greater than the minor diameter Y. The major diameter X is generally parallel to the platform 22. Thus, the stresses that have presented some problem in the prior art, are spread over a larger area, and the stress concentrations are thus reduced. A (major diameter): (minor diameter) ratio of 1.25 to 1.75 is desirable. One preferred embodiment has a ratio of approximately 1.5. In particular, one exemplary pedestal had a major diameter of 0.090", and a minor diameter of 0.65". A preferred range of minor diameters is 0.040" to 0.10" with a corresponding preferred range for the major diameters being set by the ratio range (0.05" to 0.175").

In a most preferred embodiment, the cylindrical pedestal 32, and the remaining pedestals generally above the area 38 all have a first smaller diameter than the cylindrical pedestals 36 that are adjacent the trailing edge. The pedestals 32 that are adjacent the leading edge can better withstand the thermal stresses, even adjacent platform 22, in that they tend to be longer than the pedestals spaced closer to the trailing edge. As can be appreciated from FIG. 3, the width of the chamber 30 between the pressure side 26 and suction side 28 increases moving from the trailing edge towards the leading edge. Thus, relatively small diameter pedestals 32 are relatively long and can still withstand the stresses. Moving more toward the trailing edge, it will become more difficult for the shorter pedestals to withstand the stresses.

A length to diameter (or L/D) measurement could be defined as the length of the pedestals or distance between the chamber walls, and the diameter of the pedestal. This L/D ratio can help define when the smaller diameter pedestals 34 can withstand thermal stresses. If the L/D ratio is greater than 1.5, then the pedestal is more flexible and accommodates thermal gradients rather than creating a high stress. For this calculation, the nominal diameter of the smaller diameter pedestals 32 is used for D. When the L/D ratio is less than 1.5, then the elliptical shape, or larger diameter pedestal concept might be considered.

For this reason, larger diameter pedestals 36 are arranged adjacent the trailing edge. The elliptic pedestals 34 intermediate the pedestals 32 and 36 preferably have a major diameter that roughly approximates the diameter of the cylindrical pedestals 36, while the elliptic pedestals 34 have a minor diameter that roughly approximates the diameter of the cylindrical pedestals 32. The range of the larger diameter pedestals 36 to the diameter of the smaller diameter pedestals 34 is also set by the preferred ratio range of 1.25 to 1.75 as described above.

The cylindrical pedestals 36 adjacent the trailing edge will be among the shortest, and thus the most susceptible to damage from the thermal stresses. A worker of ordinary skill in the art may recognize that making the pedestals 34 cylindrical, but of a larger diameter, rather than elliptical, might provide benefits. It is also true, however, that if the pedestals 34 were made larger and cylindrical, it would be difficult to form an appropriate loss core for forming the pedestals. There would be less space between the pedestals, and it could be difficult to form a functioning core. For this reason, it is not desirable to simply make the pedestals 34 cylindrical, but larger.

The present invention thus presents a unique shape for a pedestal that lowers stress concentrations, and improves the ability of the rotor blade to withstand thermal stresses.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A turbine blade comprising:
   a platform and an airfoil extending outwardly of said platform, said airfoil having a curve with a leading edge and a trailing edge, and a pressure wall and a suction wall spaced from each other and connecting said leading and trailing edges;
   a cooling chamber formed between said suction and pressure walls and adjacent said trailing edge, said cooling chamber being generally open with said suction and pressure walls connected by pedestals in said cooling chamber, and at least some of said pedestals being non-cylindrical, said non-cylindrical pedestals have a greater dimension in a plane generally parallel to a top surface of said platform than in a dimension perpendicular to said top surface of said platform;
   said pedestals being arranged in an array, with a plurality of columns extending along a length of said airfoil, with the length defined in a direction from which said airfoil extends from said platform, with said plurality of columns being spaced from each other in a direction from said trailing edge towards said leading edge, and said non-cylindrical pedestals being in a plurality of said plurality of columns; and
   some of said pedestals being cylindrical, and other of said pedestals being non-cylindrical.

2. The blade as set forth in claim 1, wherein said non-cylindrical pedestals are generally elliptic.

3. The blade as set forth in claim 2, wherein cooling channels are formed spaced from said cooling chamber and toward said leading edge.

4. The blade as set forth in claim 2, wherein a ratio of a major diameter of said elliptic pedestals to a minor diameter is between 1.25 and 1.75.

5. The blade as set forth in claim 1, wherein said non-cylindrical pedestals are positioned adjacent said platform in a region more subject to thermal stresses.

6. A blade as set forth in claim 1, wherein some of said pedestals are cylindrical, and there are cylindrical pedestals of varying diameters.

7. A turbine blade comprising:
   a platform and an airfoil extending outwardly of said platform, said airfoil having a curve with a leading edge and a trailing edge, and a pressure wall and a suction wall spaced from each other and connecting said leading and trailing edges;
   a cooling chamber formed between said suction and pressure walls and adjacent said trailing edge, said cooling chamber being generally open with said suction and pressure walls connected by pedestals in said cooling chamber, and at least some of said pedestals being non-cylindrical, and some of said pedestals being cylindrical, and there being cylindrical pedestals of varying diameters; and
   there are smaller diameter cylindrical pedestals on a leading edge side of said cooling chamber, and larger diameter cylindrical pedestals spaced toward said trailing edge.

8. The blade as set forth in claim 7, wherein a ratio of a diameter of said larger diameter cylindrical pedestals to a diameter of said smaller diameter cylindrical pedestals falls within a range of between 1.25 and 1.75.

9. The blade as set forth in claim 7, wherein said pedestals have a length defined between said suction and pressure walls, and if the ratio of length to a diameter of said pedestals is less than 1.5, then said pedestals are either made to be one of said larger diameter pedestals and said non-cylindrical pedestals.

10. The blade as set forth in claim 1, wherein there is a column of cylindrical pedestals spaced toward said trailing edge from said plurality of columns of non-cylindrical pedestals.

11. The blade as set forth in claim 10, wherein there is another column of cylindrical pedestals spaced toward said leading edge from said plurality of columns of non-cylindrical pedestals.

12. A gas turbine engine comprising:
a fan;
a compressor;
a combustion section;
a turbine having rotor blades, each said rotor blade having a platform and an airfoil extending outwardly of said platform, said airfoil having a curve with a leading edge and a trailing edge, and a pressure wall and a suction wall spaced from each other and connecting said leading and trailing edges, a cooling chamber formed between said suction and pressure walls and adjacent said trailing edge, said cooling chamber being generally open with said suction and pressure walls connected by pedestals in said cooling chamber, and there being pedestals of varying cross-sectioned shapes, some of said pedestals being cylindrical, and other of said pedestals being non-cylindrical; and
said pedestals being arranged in an array, with a plurality of columns extending along a length of said airfoil, with the length defined in a direction from which said airfoil extends from said platform, with said plurality of columns being spaced from each other in a direction from said trailing edge towards said leading edge, and said non-cylindrical pedestals being in a plurality of said plurality of columns, with said non-cylindrical pedestals having a greater dimension in a plane generally parallel to a top surface of said platform than in a dimension perpendicular to said top surface of said platform.

13. The gas turbine engine as set forth in claim 12, wherein said non-cylindrical pedestals are generally elliptic.

14. The gas turbine engine as set forth in claim 13, wherein cooling channels are formed spaced from said cooling chamber and toward said leading edge.

15. The gas turbine engine as set forth in claim 13, wherein a ratio of a major diameter of said elliptic pedestals to a minor diameter is between 1.25 and 1.75.

16. The gas turbine engine as set forth in claim 12, wherein said non-cylindrical pedestals are positioned adjacent said platform in a region more subject to thermal stresses.

17. The gas turbine engine as set forth in claim 16, wherein some of said pedestals are cylindrical, and there are cylindrical pedestals of varying diameters.

18. The blade as set forth in claim 16, wherein said pedestals have a length defined between said suction and pressure walls, and if the ratio of length to a diameter of the pedestals is less than 1.5, then said pedestals are either made to be one of larger diameter pedestals and said non-cylindrical pedestals.

19. The gas turbine engine as set forth in claim 12, wherein there is a column of cylindrical pedestals spaced toward said trailing edge from said plurality of columns of non-cylindrical pedestals.

20. The gas turbine engine as set forth in claim 19, wherein there is another column of cylindrical pedestals spaced toward said leading edge from said plurality of columns of non-cylindrical pedestals.

21. A gas turbine engine comprising:
a fan;
a compressor;
a combustion section;
a turbine having rotor blades, each said rotor blade having a platform and an airfoil extending outwardly of said platform, said airfoil having a curve with a leading edge and a trailing edge, and a pressure wall and a suction wall spaced from each other and connecting said leading and trailing edges, a cooling chamber formed between said suction and pressure walls and adjacent said trailing edge, said cooling chamber being generally open with said suction and pressure walls connected by pedestals in said cooling chamber, and there being pedestals of varying cross-sectioned shapes;
some of said pedestals being cylindrical, and other of said pedestals being non-cylindrical, said non-cylindrical pedestals are positioned adjacent said platform in a region more subject to thermal stresses, and there being cylindrical pedestals of varying diameters; and
there being smaller diameter cylindrical pedestals on a leading edge side of said cooling chamber, and larger diameter pedestals spaced toward said trailing edge.

22. The gas turbine engine as set forth in claim 21, wherein a ratio of a diameter of said larger diameter cylindrical pedestals to a diameter of said smaller diameter cylindrical pedestals falls within a range of between 1.25 and 1.75.

23. A turbine blade comprising:
a platform and an airfoil extending outwardly of said platform, said airfoil having a curve with a leading edge and a trailing edge, and a pressure wall and a suction wall spaced from each other and connecting said leading and trailing edges;
a cooling chamber formed between said suction and pressure walls and adjacent said trailing edge, said cooling chamber being generally open with said suction and pressure walls connected by pedestals in said cooling chamber, there being pedestals of varying cross-sectional shapes, wherein some of said varying cross-sectional shaped pedestals are cylindrical, and others are non-cylindrical; and
said pedestals being arranged in an array, with a plurality of columns extending along a length of said airfoil, with the length defined in a direction from which said airfoil extends from said platform, with said plurality columns being spaced from each other in a direction from said trailing edge to said leading edge, and non-cylindrical pedestals being in a plurality of said plurality of columns, with said non-cylindrical pedestals having a greater dimension in a plane generally parallel to a top surface of said platform than in a dimension perpendicular to said top surface of said platform.

24. The blade as set forth in claim 23, wherein said cylindrical pedestals include pedestals of varying diameters.

25. The blade as set forth in claim 24, wherein smaller diameter pedestals are positioned within said cooling chamber spaced more toward said leading edge, and larger diameter pedestals are formed within said cooling chamber spaced more toward said trailing edge, with said non-cylindrical pedestals intermediate said small diameter and said large diameter pedestals.

26. The blade as set forth in claim 25, wherein a ratio of a diameter of said larger diameter cylindrical pedestals to a diameter of said smaller diameter cylindrical pedestals falls within a range of between 1.25 and 1.75.

27. The blade as set forth in claim 25, wherein said non-cylindrical pedestals are generally elliptic and have a major diameter and a minor diameter, with said smaller diameter pedestals having a diameter roughly equal to said minor diameter of said elliptic pedestals, and said larger diameter cylindrical pedestals having a diameter roughly equivalent to said major diameter of said elliptic pedestals.

28. The blade as set forth in claim 27, wherein a ratio of said major diameter to said minor diameter falls within a range between 1.25 and 1.75.

29. The blade as set forth in claim 23, wherein there is a column of cylindrical pedestals spaced toward said trailing edge from said plurality of columns of non-cylindrical pedestals.

30. The blade as set forth in claim 29, wherein there is another column of cylindrical pedestals spaced toward said leading edge from said plurality of columns of non-cylindrical pedestals.

31. A turbine blade comprising:
a platform and an airfoil extending outwardly of said platform, said airfoil having a curve with a leading edge and a trailing edge, and a pressure wall and a suction wall spaced from each other and connecting said leading and trailing edges;
a cooling chamber formed between said suction and pressure walls and adjacent said trailing edge, said cooling chamber being generally open with said suction and pressure walls connected by pedestals in said cooling chamber, there being pedestals of varying cross-sectional shapes, smaller diameter pedestals are positioned within said cooling chamber spaced more toward said leading edge, and larger diameter pedestals are formed within said cooling chamber spaced more toward said trailing edge.

32. The blade as set forth in claim 31, wherein a ratio of said larger diameter to said smaller diameter is between 1.25 and 1.75.

33. The blade as set forth in claim 31, wherein said pedestals have a length defined between said suction and pressure walls, and if the ratio of length to a diameter of said pedestals is less than 1.5, then said pedestals are either made to be one of said larger diameter pedestals and said non-cylindrical pedestals.

* * * * *

UNITED STATES PATENT AND TRADEMARK OFFICE
CERTIFICATE OF CORRECTION

PATENT NO.         : 7,175,386 B2
APPLICATION NO. : 10/738842
DATED              : February 13, 2007
INVENTOR(S)        : Cherolis et al.

It is certified that error appears in the above-identified patent and that said Letters Patent is hereby corrected as shown below:

Claim 23, Column 6, line 55: Please insert --of-- after "plurality"

Signed and Sealed this

Seventeenth Day of April, 2007

JON W. DUDAS
*Director of the United States Patent and Trademark Office*